(12) United States Patent
Zhang

(10) Patent No.: US 12,221,154 B2
(45) Date of Patent: Feb. 11, 2025

(54) CLUTCH APPARATUS, VEHICLE STEERING SYSTEM, AND VEHICLE

(71) Applicant: BYD COMPANY LIMITED, Guangdong (CN)

(72) Inventor: Peng Zhang, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 0 days.

(21) Appl. No.: 18/210,021

(22) Filed: Jun. 14, 2023

(65) Prior Publication Data

US 2023/0339531 A1  Oct. 26, 2023

Related U.S. Application Data

(63) Continuation of application No. PCT/CN2021/142670, filed on Dec. 29, 2021.

(30) Foreign Application Priority Data

Dec. 30, 2020 (CN) .......................... 202011630575.3
Dec. 30, 2020 (CN) .......................... 202011630591.2

(51) Int. Cl.
*B62D 1/20* (2006.01)

(52) U.S. Cl.
CPC ..................................... *B62D 1/20* (2013.01)

(58) Field of Classification Search
CPC .......... B62D 1/20; B62D 5/003; B62D 5/001; B62D 1/16; B62D 3/02; F16D 28/00;
(Continued)

(56) References Cited

U.S. PATENT DOCUMENTS

2005/0155809 A1  7/2005 Krzesicki et al.
2005/0274565 A1  12/2005 Greenwell et al.
(Continued)

FOREIGN PATENT DOCUMENTS

CN  204432743 U  7/2015
CN  107235072 A  10/2017
(Continued)

OTHER PUBLICATIONS

Steinmeier et al. DE 19902553 Steerable stop for steering systems, Machine English translation, ip.com (Year: 2006).*
(Continued)

*Primary Examiner* — Karen Beck

(57) ABSTRACT

A clutch apparatus includes: a first transmission portion and a second transmission portion, where the second transmission portion is configured to move between an engaged position and a disengaged position, the second transmission portion is engaged with the first transmission portion and transmits torque at the engaged position, and the second transmission portion is disengaged from the first transmission portion and stop transmitting the torque at the disengaged position; a sleeve, sleeved on the second transmission portion; and a driving mechanism, including a driving apparatus and a linkage mechanism, where the linkage mechanism is in connection with the driving apparatus and the sleeve, and the driving apparatus drives the linkage mechanism to move, through the sleeve, to drive the second transmission portion to move between the engaged position and the disengaged position.

19 Claims, 9 Drawing Sheets

(58) Field of Classification Search
CPC ............... F16D 11/04; F16D 2023/123; B60Y 2400/42; B60Y 2410/102
See application file for complete search history.

(56) References Cited

U.S. PATENT DOCUMENTS

2009/0188728 A1* 7/2009 Osborne .................. B62D 1/02
 180/6.24
2011/0247891 A1* 10/2011 Meyer .................. B62D 5/0403
 180/443

FOREIGN PATENT DOCUMENTS

| CN | 207747931 U | 8/2018 | | |
|----|-------------|---------|---|---|
| CN | 109229199 A | 1/2019 | | |
| CN | 109764068 A | 5/2019 | | |
| CN | 110239614 A | 9/2019 | | |
| CN | 110696912 A | 1/2020 | | |
| CN | 110949500 A | 4/2020 | | |
| CN | 110949501 A | 4/2020 | | |
| CN | 111006886 A | 4/2020 | | |
| CN | 210427027 U | 4/2020 | | |
| CN | 111114620 A | 5/2020 | | |
| CN | 210971246 U | 7/2020 | | |
| CN | 111559420 A | 8/2020 | | |
| CN | 211336154 U | 8/2020 | | |
| CN | 211336155 U | 8/2020 | | |
| CN | 211336156 U | 8/2020 | | |
| CN | 211494208 U | 9/2020 | | |
| CN | 211519637 U | 9/2020 | | |
| CN | 211869497 U | 11/2020 | | |
| CN | 211869498 U | 11/2020 | | |
| CN | 214112672 U | 9/2021 | | |
| DE | 19902553 A1 * | 7/2000 | ............... | B62D 1/16 |
| JP | 2003048550 A | 2/2003 | | |
| JP | 2006062527 A | 3/2006 | | |
| KR | 20100099498 A | 9/2010 | | |

OTHER PUBLICATIONS

International Search Report and Written Opinion for Application No. PCT/CN2021/142670, mailed on Mar. 10, 2022, 10 pages.

* cited by examiner

CLUTCH APPARATUS, VEHICLE STEERING SYSTEM, AND VEHICLE

CROSS-REFERENCE TO RELATED APPLICATIONS

This application is a Continuation Applications of International Patent Application No. PCT/CN2021/142670, filed on Dec. 29, 2021, which is based on and claims priority to and benefits of Chinese Patent Application Nos. 202011630575.3 and 202011630591.2, both filed on Dec. 30, 2020. The entire content of all of the above-referenced applications is incorporated herein by reference.

FIELD

The present disclosure relates to the field of vehicle technologies, and more particularly, to a clutch apparatus, a vehicle steering system, and a vehicle.

BACKGROUND

Vehicles in the related art are usually equipped with a vehicle steering system for controlling a driving direction of the vehicle. However, the function of the vehicle steering system is single. The steering system always transmits steering the torque, and cannot stop transmitting the steering torque. The wheels and the steering wheel are always linked. With the improvement of emerging functions such as the in-vehicle multimedia function and automatic driving function, the vehicle steering system can no longer match these emerging functions, resulting in a poor applicability and user experience.

SUMMARY

The present disclosure resolves at least one of the technical problems in the related art. Therefore, a first aspect of the present disclosure provides a clutch apparatus, and the clutch apparatus can transmit and stop transmitting the steering torque with low costs and a flexible configuration.

The present disclosure further provides a vehicle steering system having the clutch apparatus.

The present disclosure further provides a vehicle having the vehicle steering system.

To achieve the foregoing objective, a clutch apparatus is provided according to embodiments of the present disclosure. The clutch apparatus includes: a first transmission portion and a second transmission portion, where the second transmission portion is configured to move between an engaged position and a disengaged position, the second transmission portion is engaged with the first transmission portion and transmits torque at the engaged position, and the second transmission portion is disengaged from the first transmission portion and stop transmitting torque at the disengaged position; a sleeve, sleeved on the second transmission portion; and a driving mechanism, including a driving apparatus and a linkage mechanism, where the linkage mechanism is in connection with the driving apparatus and the sleeve, and the driving apparatus drives the linkage mechanism to move, through the sleeve, to drive the second transmission portion to move between the engaged position and the disengaged position.

According to the clutch apparatus in the embodiments of the present disclosure, the driving mechanism includes a driving apparatus and a linkage mechanism, where the linkage mechanism is in connection with the driving apparatus and the sleeve, and the driving apparatus drives the linkage mechanism to swing, through the sleeve, to drive the second transmission portion to move between the engaged position and the disengaged position. In this way, the second transmission portion can move through the driving apparatus, so that the steering torque can be transmitted or transmitting the steering torque can be stopped.

By configuring the linkage mechanism, while a driving force is transmitted between the driving apparatus and the second transmission portion, the linkage mechanism can increase a force for driving the second transmission portion to move, and therefore, requirements for the driving force outputted by the driving apparatus can be reduced, and costs of the driving apparatus are reduced. In addition, the linkage mechanism can increase the movement travel of the second transmission portion, and can transmit the driving force in a long distance between the driving apparatus and the second transmission portion, improving the configuration flexibility of the second transmission portion, the sleeve, and the driving mechanism.

The clutch apparatus according to the embodiments of the present disclosure can transmit the steering torque and stop transmitting the steering torque with low costs and a flexible configuration.

According to some embodiments of the present disclosure, there are a first hinge point and a second hinge point between the linkage mechanism and the sleeve, and a connection line between the first hinge point and the second hinge point passes through a center of a cross section of the sleeve.

According to some embodiments of the present disclosure, the cross section of the sleeve is annular, and the first hinge point and the second hinge point are disposed opposite to each other in a radial direction of the sleeve.

According to some embodiments of the present disclosure, the clutch apparatus further includes: a third transmission portion, where the second transmission portion is connected to the third transmission portion, the second transmission portion is coupled with the third transmission portion to transmit torque, and the second transmission portion is configured to move with respect to the third transmission portion between the engaged position and the disengaged position.

According to some embodiments of the present disclosure, the third transmission portion includes a cavity, and the second transmission portion extends into the cavity; and one of an inner circumferential surface of the third transmission portion and an outer circumferential surface of the second transmission portion includes a slide groove, and the other one of the inner circumferential surface of the third transmission portion and the outer circumferential surface of the second transmission portion includes a slide rail, the slide groove and the slide rail extend in an axial direction of the first transmission portion and the second transmission portion, and the slide rail into with the slide groove.

According to some embodiments of the present disclosure, the second transmission portion includes: a shaft portion; a head portion, connected to an end of the shaft portion facing toward the first transmission portion, where when the second transmission portion is at the engaged position, the head portion is engaged with the first transmission portion; and when the second transmission portion is at the disengaged position, the head portion is disengaged from the first transmission portion.

According to some embodiments of the present disclosure, one of the first transmission portion and the second transmission portion includes a flange, and the other one of the first transmission portion and the second transmission portion includes a groove, and a cross section of the flange and a cross section of the groove have non-circular shapes coupled to each other, where when the second transmission portion is at the engaged position, the flange extends into the groove; and when the second transmission portion is at the disengaged position, the flange is disengaged from the groove.

According to some embodiments of the present disclosure, the clutch apparatus further includes: a housing, where at least a part of the first transmission portion, at least a part of the second transmission portion, and the sleeve are disposed in the housing, and the driving mechanism is mounted on the housing.

According to some embodiments of the present disclosure, the first transmission portion is supported on the housing by a first bearing; the second transmission portion is supported on the sleeve by a second bearing; and the sleeve is supported on the housing by a third bearing.

According to some embodiments of the present disclosure, the clutch apparatus further includes: an elastic member, acting on the sleeve and providing an elastic force for pushing the second transmission portion toward the engaged position.

According to some embodiments of the present disclosure, the clutch apparatus further includes: a spring seat, sleeved on the second transmission portion and disposed in the sleeve; and a spring sleeve, sleeved on the second transmission portion and disposed in the housing, where the elastic member is a spring sleeved on the second transmission portion, and a first end of the elastic member abuts against the spring seat and a second end of the elastic member abuts against an interior of the spring sleeve.

According to some embodiments of the present disclosure, the linkage mechanism is hinged with the sleeve and the spring seat by a hinge shaft, and the housing includes a strip-shaped hole for the hinge shaft to pass through.

According to some embodiments of the present disclosure, the driving mechanism includes: a transmission mechanism, where the driving apparatus is in connection with the linkage mechanism through the transmission mechanism, the driving apparatus is hinged with the housing, and the linkage mechanism is hinged with the transmission mechanism, the housing, and the sleeve.

According to some embodiments of the present disclosure, the linkage mechanism includes: a first swing connector, where a first end of the first swing connector is hinged with the transmission mechanism, and a second end of the first swing connector is hinged with the sleeve; a second swing connector, where a first end of the second swing connector is hinged with the transmission mechanism, and a second end of the second swing connector is hinged with the sleeve; and a longitudinal connecting rod, where a first end of the longitudinal connecting rod is hinged with the housing, and a second end of the longitudinal connecting rod is hinged with the first swing connector and the second swing connector.

According to some embodiments of the present disclosure, the transmission mechanism includes: an output screw rod, where the output screw rod is in connection with the driving apparatus; and an output nut, where the output nut is sleeved on the output screw rod and threaded with the output screw rod, where the first end of the first swing connector and the first end of the second swing connector are hinged with the output nut.

According to some embodiments of the present disclosure, the transmission mechanism further includes: a transmission screw rod, where the driving apparatus includes a motor, and the transmission screw rod is in connection with a motor shaft of the motor; a first transmission gear, where the first transmission gear meshes with the transmission screw rod; and a second transmission gear, where the second transmission gear is connected to the first transmission gear and rotates with the first transmission gear, and the second transmission gear meshes with the output screw rod.

According to some embodiments of the present disclosure, the first swing connector and the second swing connector are respectively hinged with two radial sides of the output nut, and a hinge axis of the first swing connector coincides with a hinge axis of the second swing connector and is perpendicular to a radial direction of the output nut.

According to some embodiments of the present disclosure, the longitudinal connecting rod is hinged between the first end and the second end of the first swing connector and hinged between the first end and the second end of the second swing connector, the longitudinal connecting rod is coupled with the first swing connector at a first hinge joint, the longitudinal connecting rod is coupled with the second swing connector at a second hinge joint, and a position of the first hinge joint disposed in a length direction of the first swing connector is consistent with a position of the second hinge joint disposed in a length direction of the second swing connector.

According to the embodiments of the present disclosure, a vehicle steering system is provided, including: the clutch apparatus according to any foregoing embodiment of the present disclosure; a steering wheel, where the steering wheel is in connection with one of the first transmission portion and the second transmission portion; and a steering device, where the steering device is in connection with the other one of the first transmission portion and the second transmission portion.

The vehicle steering system according to the embodiments of the present disclosure, by using the clutch apparatus according to any foregoing embodiment of the present disclosure, can transmit the steering torque and stop transmitting the steering torque with low costs and a flexible configuration.

In some embodiments of the present disclosure, the vehicle steering system further includes a rotation angle limiting device, where the rotation angle limiting device is connected to one of the first transmission portion and the second transmission portion, and when the second transmission portion is at the disengaged position, the rotation angle limiting device limits a maximum rotation angle of the steering wheel by limiting a maximum rotation angle of one of the first transmission portion and the second transmission portion.

According to the embodiments of the present disclosure, a vehicle is provided, including the vehicle steering system according to any foregoing embodiment of the present disclosure.

The vehicle according to the embodiments of the present disclosure, by using the vehicle steering system according to any foregoing embodiment of the present disclosure, can transmit the steering torque and stop transmitting the steering torque with low costs and a flexible configuration.

Other aspects and advantages of the present disclosure will be given in the following descriptions, some of which will become apparent from the following descriptions or may be learned from practices of the present disclosure.

BRIEF DESCRIPTION OF THE DRAWINGS

The foregoing and/or additional aspects and advantages of the present disclosure will become apparent and comprehensible from the following descriptions of the embodiments with reference to the accompanying drawings, where.

Figure 1:
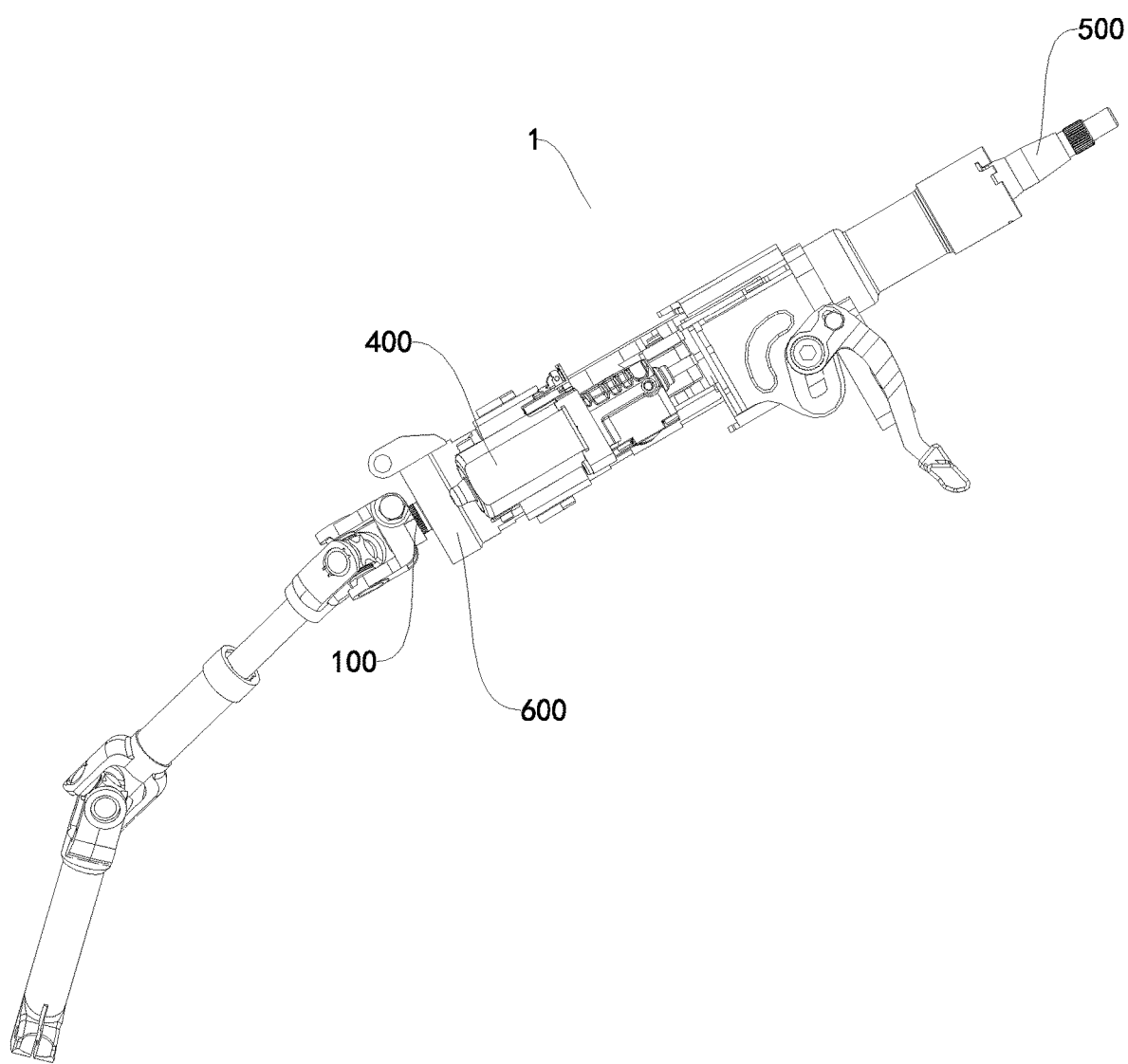
FIG. 1 is a schematic structural diagram of a clutch apparatus according to an embodiment of the present disclosure.

REFERENCE NUMERALS clutch apparatus 1,
first transmission portion 100, flange 110,
second transmission portion 200, shaft portion 220, head portion 230, groove 240,
sleeve 300, first hinge point 310, second bearing 330, third bearing 320, spring seat 340,
driving mechanism 400, second hinge point 410, driving apparatus 430, transmission mechanism 440, output screw rod 441, output nut 442, transmission screw rod 443, first transmission gear 444, second transmission gear 445, linkage mechanism 450, first swing connector 451, second swing connector 452, longitudinal connecting rod 453, strip-shaped hole 455, hinge shaft 460,
third transmission portion 500, cavity 510, fourth bearing 520,
housing 600, first bearing 610, spring sleeve 620,
elastic member 700,
rotation angle limiting device 30100, rotating gear 3001, fixed member 3004, fitting groove 30041, spiral groove 30011, first limiting structure 30012, movable member 30302, guide shaft 30021, second limiting structure 3003, first limiting sub-structure 30031, and second limiting sub-structure 30032.

DETAILED DESCRIPTION

The following describes embodiments of the present disclosure in detail. Examples of the embodiments are shown in the accompanying drawings, and same or similar reference numerals in all the accompanying drawings indicate same or similar components or components having same or similar functions. The embodiments described below with reference to the accompanying drawings are exemplary and used merely for explaining the present disclosure, and should not be construed as a limitation on the present disclosure.

In the descriptions of the present disclosure, it should be understood that, orientations or position relationships indicated by terms such as "center", "longitudinal", "transverse", "length", "width", "thickness", "up", "down", "front", "back", "left", "right", "vertical", "horizontal", "top", "bottom", "inner", "outer", "clockwise", "counterclockwise", "axial", "radial", and "circumferential" are orientations or position relationship shown based on the accompanying drawings, and are merely used for describing the present disclosure and simplifying the descriptions, rather than indicating or implying that the apparatus or element should have a particular orientation or be constructed and operated in a particular orientation, and therefore, should not be construed as a limitation on the present disclosure.

In the descriptions of the present disclosure, "a number of" means two or more than two, and "several" means one or more.

A clutch apparatus 1 according to the embodiments of the present disclosure is described below with reference to the accompanying drawings.

As shown in FIG. 1 to FIG. 10, the clutch apparatus 1 includes a first transmission portion 100, a second transmission portion 200, a sleeve 300, and a driving mechanism 400.

The first transmission portion 100 and the second transmission portion 200 may be axial structures. The second transmission portion 200 is movable or configured to move between an engaged position and a disengaged position, the second transmission portion 200 is engaged with the first transmission portion 100 and transmits the torque at the engaged position, and the second transmission portion 200 is disengaged from the first transmission portion 100 and stops transmitting the torque at the disengaged position. The sleeve 300 is sleeved on the second transmission portion 200. The driving mechanism 400 includes a driving apparatus 430 and a linkage mechanism 450. The linkage mechanism 450 is in connection with the driving apparatus 430 and the sleeve 300, and the driving apparatus 430 drives the linkage mechanism 450 to swing, through the sleeve 300, to drive the second transmission portion 200 to move between the engaged position and the disengaged position.

For example, the sleeve 300 and the second transmission portion 200 can synchronously move in an axial direction of the second transmission portion 200 and can rotate relative to each other along a circumferential direction of the second transmission portion 200. That is, the sleeve 300 and the second transmission portion 200 can synchronously move in an axial direction of the second transmission portion 200 and can rotate relative to each other along a circumferential direction of the second transmission portion 200.

Figure 3:
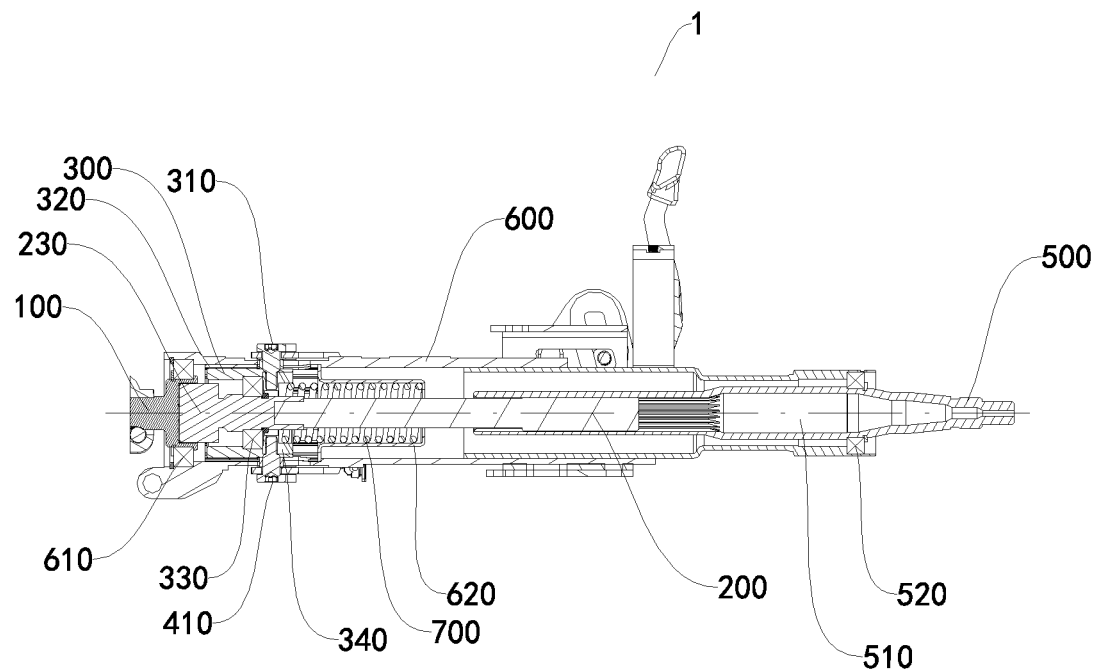
FIG. 3 is a sectional view of a clutch apparatus according to an embodiment of the present disclosure, where a second transmission portion is located at an engaged position.
Figure 4:
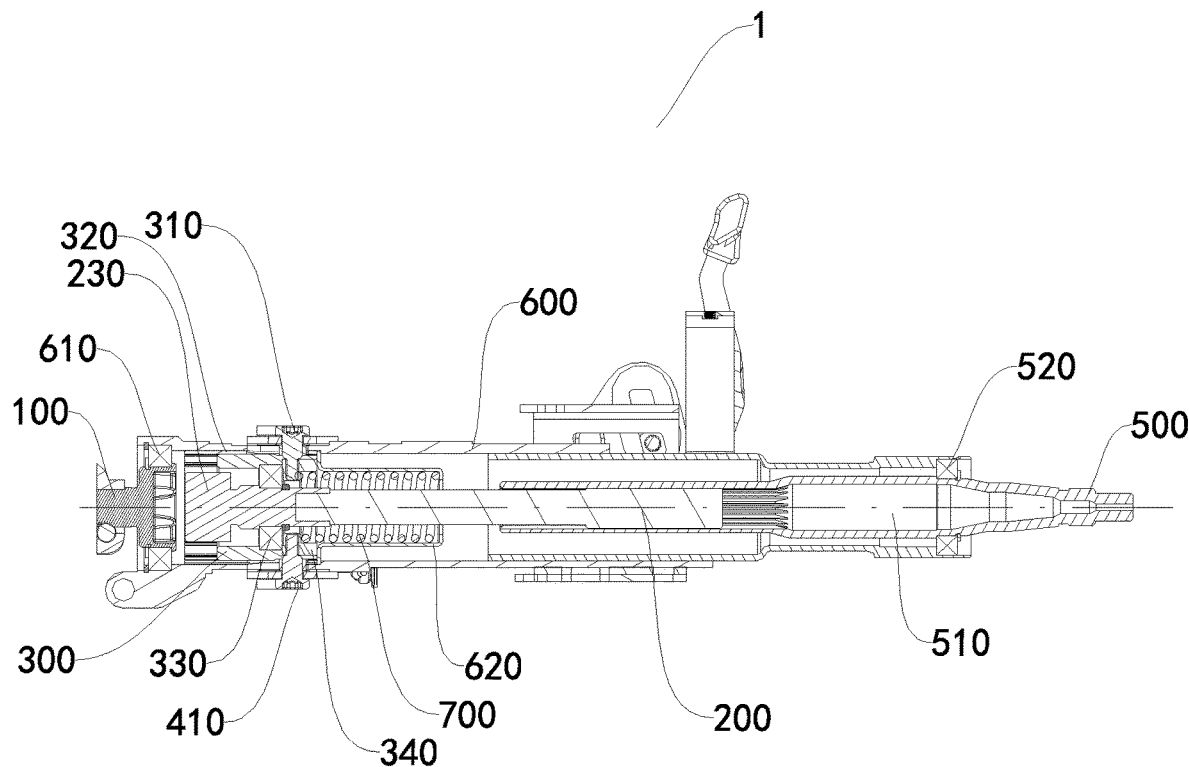
FIG. 4 is a sectional view of a clutch apparatus according to an embodiment of the present disclosure, where a second transmission portion is located at a disengaged position.
Figure 7:
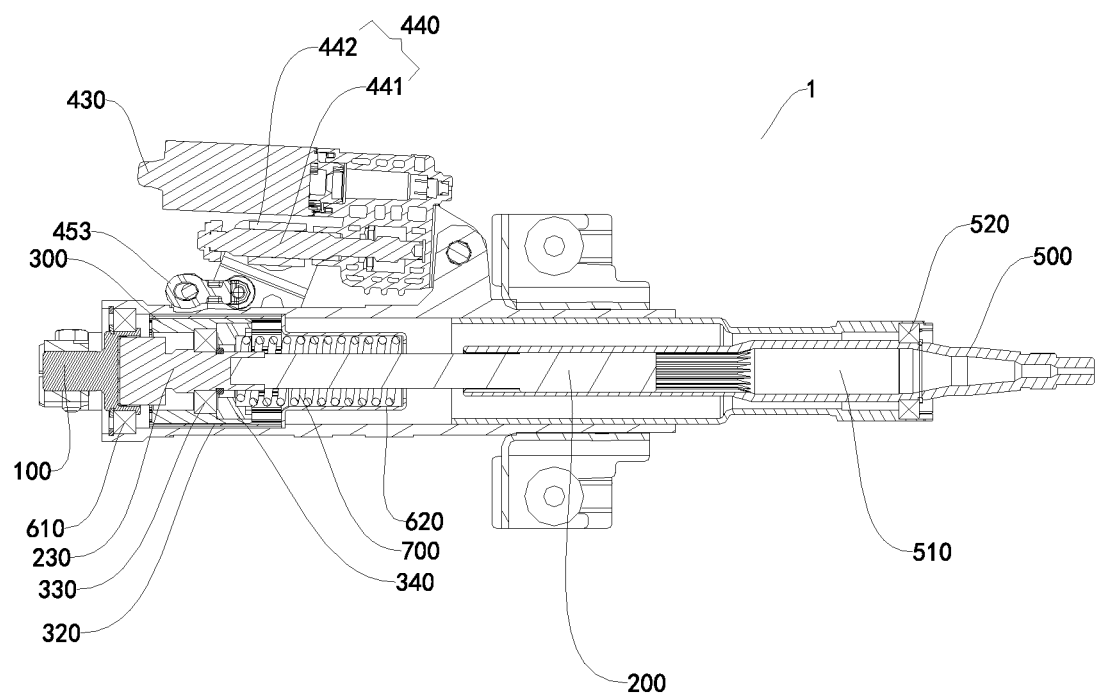
FIG. 7 is a sectional view of a clutch apparatus from another perspective according to an embodiment of the present disclosure, where a second transmission portion is located at an engaged position.
Figure 8:
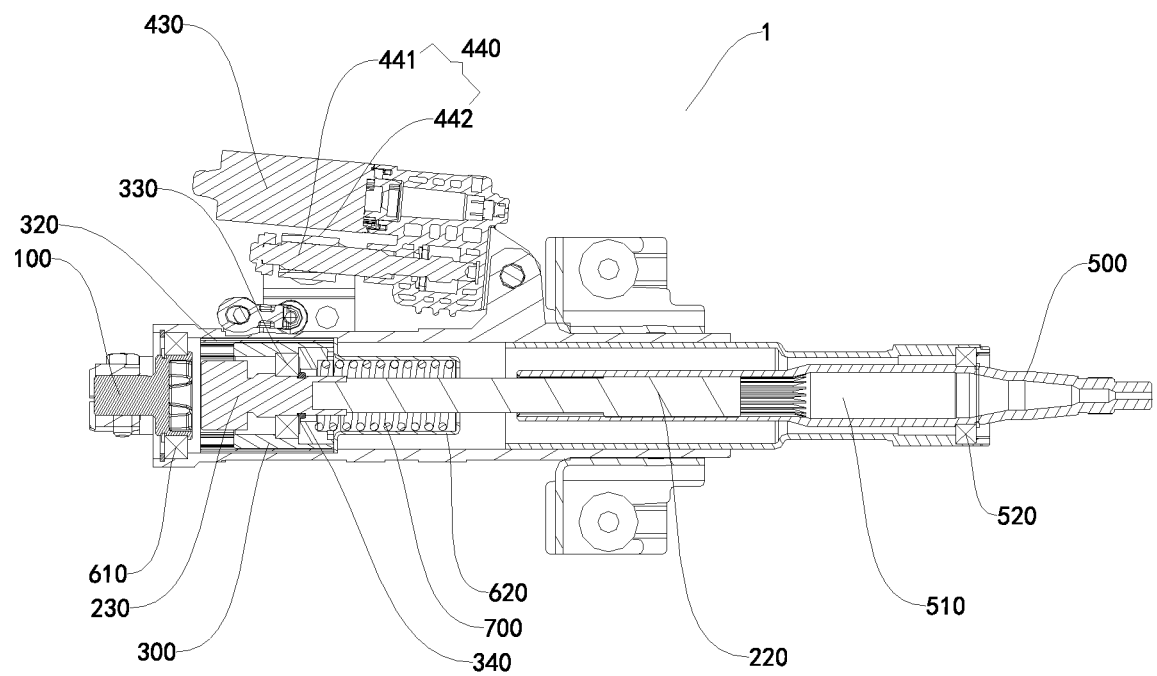
FIG. 8 is a sectional view of a clutch apparatus from another perspective according to an embodiment of the present disclosure, where a second transmission portion is located at a disengaged position.

The clutch apparatus 1 according to the embodiments of the present disclosure makes the second transmission portion 200 to move between the engaged position and the disengaged position, the second transmission portion 200 is engaged with the first transmission portion 100 and transmits the torque at the engaged position, and the second transmission portion 200 is disengaged from the first transmission portion 100 and stops transmitting the torque at the disengaged position. That is, when the first transmission portion 100 and the second transmission portion 200 are at the engaged position, the first transmission portion 100 and the second transmission portion 200 can synchronously rotate, as shown in FIG. 3 and FIG. 7; and when the first transmission portion 100 and the second transmission portion 200 are at the disengaged position, the first transmission portion 100 and the second transmission portion 200 can rotate independently, in other words, when the first transmission portion 100 rotates, the second transmission portion 200 may rotate or may not rotate. Similarly, when the second transmission portion 200 rotates, the first transmission portion 100 may rotate or may not rotate, as shown in FIG. 4 and FIG. 8.

For example, the clutch apparatus 1 is applied to a vehicle steering system, and when the second transmission portion 200 is at the engaged position, the vehicle steering system can normally transmit the moment of force or the torque of a steering wheel operated by a driver to a steering device.

When the second transmission portion 200 is at the disengaged position, the steering wheel and the steering device are disconnected. In this case, the steering wheel rotates, and the steering device is not driven to move with the steering wheel, but the steering wheel can still drive components, such as a combined switch, a clock spring, and an angle sensor, to normally operate. The steering wheel in this state may be used as a simulator of vehicle driving and may output a rotation angle signal of the steering wheel to an in-vehicle device or an external device. For example, in this case, the steering wheel may be used for control in-vehicle multimedia and playing a racing game. In addition, the movement of the steering device in this case does not drive the steering wheel to move. For example, when the vehicle is in a remote driving state or an autonomous driving state, the steering device moves to control the entire vehicle to steer, and the steering wheel may not rotate with the steering device, to ensure the safety of the driver and ride comfort.

In addition, the sleeve 300 is sleeved on the second transmission portion 200, the driving mechanism 400 includes the driving apparatus 430 and the linkage mechanism 450, the linkage mechanism 450 is in connection with the driving apparatus 430 and the sleeve 300, and the driving apparatus 430 drives the linkage mechanism 450 to move, for example, the driving apparatus 430 drives the linkage mechanism 450 to swing, through the sleeve 300, to drive the second transmission portion 200 to move between the engaged position and the disengaged position. In this way, the second transmission portion 200 can move through the driving apparatus 430, so that steering torque can be transmitted or transmitting the steering torque can be stopped.

In addition, by configuring the linkage mechanism 450, while a driving force is transmitted between the driving apparatus 430 and the second transmission portion 200, the linkage mechanism 450 can increase a force for driving the second transmission portion 200 to move, and therefore, requirements for the driving force outputted by the driving apparatus 430 can be reduced, and costs of the driving apparatus 430 are reduced. In addition, the linkage mechanism 450 can increase the movement travel of the second transmission portion 200 and can transmit the driving force in a long distance between the driving apparatus 430 and the second transmission portion 200. With diversity of force transmission of the linkage mechanism 450, while the sleeve 300 and the second transmission portion 200 are driven to move according to a predetermined path, requirements for the position of the driving apparatus 430 are reduced, and the configuration flexibility of the driving apparatus 430 is improved.

By configuring the sleeve 300, the sleeve 300 and the second transmission portion 200 can synchronously move in the axial direction of the second transmission portion 200, and the driving apparatus 430 and the second transmission portion 200 can rotate along the circumferential direction of the second transmission portion 200 in a same manner, so that the second transmission portion 200 can be driven, through the sleeve 300, to move in the axial direction, and the second transmission portion 200 can rotate without being affected by the sleeve 300.

In this way, the clutch apparatus 1 according to the embodiments of the present disclosure can transmit the steering torque or stop transmitting the steering torque with low costs and a flexible configuration.

According to some embodiments of the present disclosure, as shown in FIG. 3 and FIG. 4, there are a first hinge point 310 and a second hinge point 410 between the linkage mechanism 450 and the sleeve 300, and a connection line between the first hinge point 310 and the second hinge point 410 passes through a center of a cross section of the sleeve 300. In this way, a moment arm between the first hinge point 310 and the sleeve 300 and a moment arm between the second hinge point 410 and the sleeve 300 are located at a same straight line. That is, a torque of the entire clutch apparatus 1 may be symmetrical with respect to a central axis of the clutch apparatus 1, which helps to remove a turning torque of the sleeve 300, ensures that the sleeve 300 moves in an extending direction of the sleeve 300, and increases the movement smoothness of the second transmission portion 200, thereby preventing the second transmission portion 200 from being stuck during the movement.

It needs to be noted that the cross section of the sleeve 300 is a cross section perpendicular to an axial direction of the sleeve 300.

For example, a plane on which a cross section of the sleeve 300 is located passes through the first hinge point 310 and the second hinge point 410 at the same time, the connection line between the first hinge point 310 and the second hinge point 410 passes through a center of the cross section, and a distance from the first hinge point 310 to the center of the cross section and a distance from the second hinge point 410 to the center of the cross section may be the same.

Figure 2:
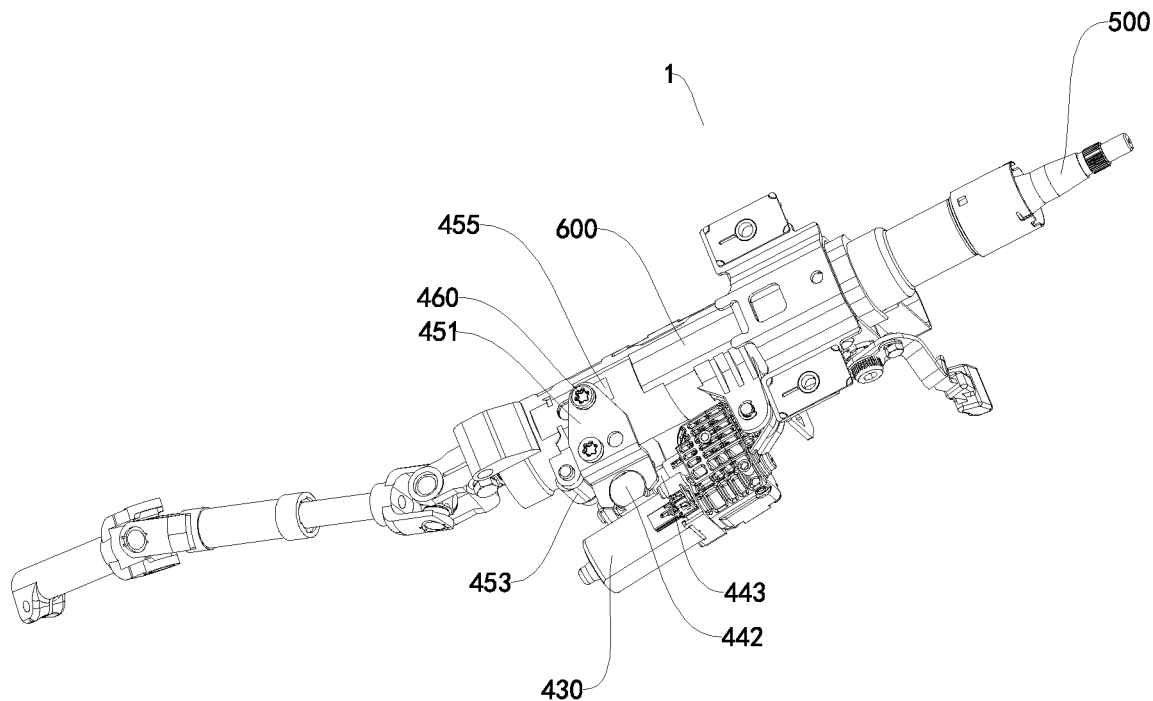
FIG. 2 is a schematic structural diagram of a clutch apparatus from another perspective according to an embodiment of the present disclosure.

According to some embodiments of the present disclosure, as shown in FIG. 1 and FIG. 2, the cross section of the sleeve 300 is annular, such as circular. The first hinge point 310 and the second hinge point 410 are arranged/disposed opposite to each other in a radial direction of the sleeve 300. Such shapes of the sleeve 300 are for ease of production and processing, and disassembly and replacement. In addition, the entire sleeve 300 is uniformly forced, which avoids the stress concentration, and further ensures the movement smoothness of the second transmission portion 200. Certainly, it may be understood that, a shape of the cross section of the sleeve 300 is not limited to this, for example, the shape may be square.

According to some embodiments of the present disclosure, as shown in FIG. 3 and FIG. 4, and FIG. 7 and FIG. 8, the clutch apparatus 1 further includes a third transmission portion 500.

The third transmission portion 500 may be an axial structure, the second transmission portion 200 is connected to the third transmission portion 500, and the second transmission portion 200 cooperates with the third transmission portion 500 to transmit the torque. That is, the second transmission portion 200 and the third transmission portion 500 can synchronously rotate to transmit the torque, and the second transmission portion 200 is movable or configured to move relative to the third transmission portion 500 between the engaged position and the disengaged position (that is, movable in an axial direction). The third transmission portion 500 may be fixed to the steering wheel.

Therefore, the second transmission portion 200 and the third transmission portion 500 can synchronously rotate, that is, the torque can be transmitted between the second transmission portion 200 and the third transmission portion 500, and the second transmission portion 200 and the third transmission portion 500 can independently move in the axial direction of the second transmission portion 200 (an axial direction of the third transmission portion 500), that is, when the second transmission portion 200 moves in the axial direction of the second transmission portion 200, the third transmission portion 500 does not move. In this way, when the second transmission portion 200 can switch between an engaged state and a disengaged state, the steering wheel can synchronously rotate with the third transmission portion 500, ensuring that a position of the steering wheel is stable in the axial direction of the third transmission portion 500, so that the steering wheel can be used to input the steering torque, and regardless of a moving manner of the second transmission portion 200 in the axial direction, the third transmission portion 500 can eliminate the movement, and then the steering wheel does not move in the axial direction.

In some embodiments of the present disclosure, the third transmission portion 500 includes a cavity 510, the second transmission portion 200 extends into the cavity 510, one of an inner circumferential surface of the third transmission portion 500 and an outer circumferential surface of the second transmission portion 200 is provided with a slide groove, and the other one of the inner circumferential surface of the third transmission portion 500 and the outer circumferential surface of the second transmission portion 200 is provided with a slide rail, the slide groove and the slide rail both extend in the axial direction of the first transmission portion 100 and the second transmission portion 200, and the slide rail fits into/couples with the slide groove. The slide groove and the slide rail may be splines fitting each other. The axial direction of the first transmission portion 100, the axial direction of the second transmission portion 200, and the third transmission portion 500 may be parallel to each other. In this way, the torque can be transmitted between the second transmission portion 200 and the third transmission portion 500, and the second transmission portion 200 and the third transmission portion 500 can move with respect to each other in the axial direction, with easy processing and a low difficulty.

Figure 9:
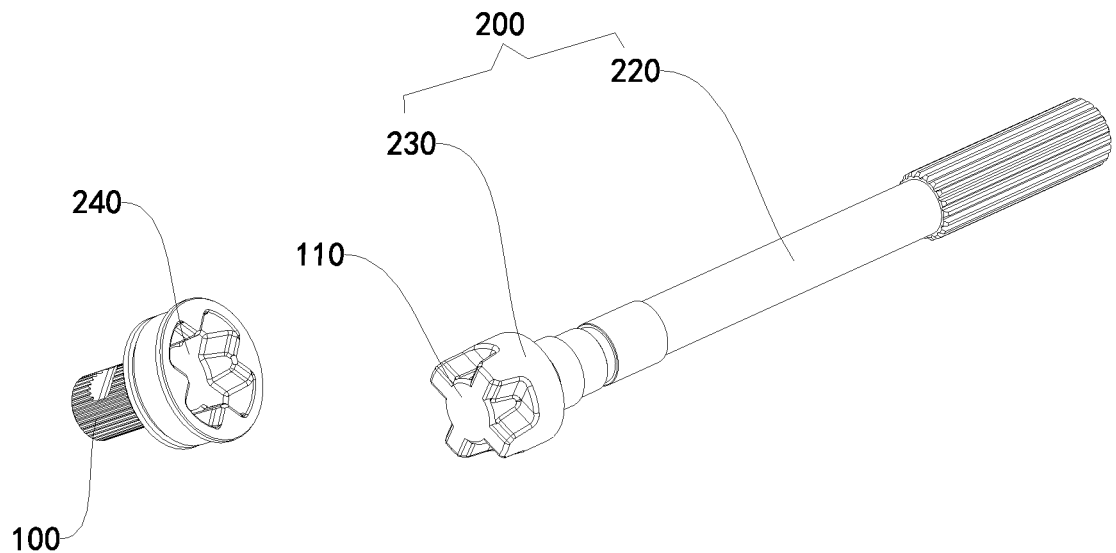
FIG. 9 is a schematic structural diagram of a first transmission portion and a second transmission portion of a clutch apparatus according to an embodiment of the present disclosure.

According to some embodiments of the present disclosure, as shown in FIG. 9, the second transmission portion 200 includes a shaft portion 220 and a head portion 230. The head portion 230 is connected to an end of the shaft portion 220 facing toward the first transmission portion 100. For example, the head portion 230 and the shaft portion 220 may be fixed by welding. When the second transmission portion 200 is at the engaged position, the head portion 230 is engaged with the first transmission portion 100; and when the second transmission portion 200 is at the disengaged position, the head portion 230 is disengaged from the first transmission portion 100.

For example, a cross-sectional area of the head portion 230 may be greater than a cross-sectional area of the shaft portion 220. In this way, when the second transmission portion 200 is located at the engaged position, by configuring the head portion 230, the torque is more stably transmitted between the second transmission portion 200 and the first transmission portion 100. In addition, by configuring the shaft portion 220, production cost of the second transmission portion 200 can be reduced, the assembling space required for the second transmission portion 200 is reduced, and it is beneficial to miniaturization of the clutch apparatus 1.

In some embodiments of the present disclosure, one of the first transmission portion 100 and the second transmission portion 200 includes a flange 110, and the other one of the first transmission portion 100 and the second transmission portion 200 includes a groove 240. A cross section of the flange 110 and a cross section of the groove 240 are non-circular and adapted to each other. For example, the flange 110 is formed on an end surface of the head portion 230 facing toward the first transmission portion 100, the groove 240 is formed on an end surface of the first transmission portion 100 facing toward the head portion 230, and the cross section of the flange 110 and the cross section of the groove 240 may include a shape of a cross, a rectangle, a wedge shape, a circular arc, an involute curve, or other curves.

When the second transmission portion 200 is at the engaged position, the flange 110 extends into the groove 240; and when the second transmission portion 200 is at the disengaged position, the flange 110 is disengaged from the groove 240. In this way, when the first transmission portion 100 and the second transmission portion 200 are in an engaged state, the first transmission portion 100 is stably connected to the second transmission portion 200 to stably transmit the torque.

According to some embodiments of the present disclosure, as shown in FIG. 3 and FIG. 4, and FIG. 7 and FIG. 8, the clutch apparatus 1 further includes a housing 600. At least a part of the first transmission portion 100, at least a part of the second transmission portion 200, and the sleeve 300 are arranged/disposed in the housing 600. For example, a part of the first transmission portion 100, the second transmission portion 200, the sleeve 300, and a part of the third transmission portion 500 may be arranged/disposed in the housing 600. The driving mechanism 400 is mounted/disposed outside the housing 600.

By configuring the housing 600, on one hand, the assembling position for the driving mechanism 400 is provided, on the other hand, a direct contact area between the first transmission portion 100 and the second transmission portion 200 and the outside can be reduced, and the damage possibility of the first transmission portion 100 and the second transmission portion 200 is reduced.

According to some embodiments of the present disclosure, as shown in FIG. 3 and FIG. 4, and FIG. 7 and FIG. 8, the first transmission portion 100 is supported on the housing 600 by a first bearing 610, the second transmission portion 200 is supported on the sleeve 300 by a second bearing 330, the sleeve 300 is supported on the housing 600 by a third bearing 320, and an end of the third transmission portion 500 away from the second transmission portion 200 may be supported in the housing 600 by a fourth bearing 520.

For example, the third bearing 320 may be a slide bearing, reducing sliding friction between the sleeve 300 and the housing 600. In this way, the connection between the first transmission portion 100 and the housing 600 is stable while facilitating the relative rotation, the connection between the sleeve 300 and the second transmission portion 200 is stable while facilitating the relative rotation, the connection between the sleeve 300 and the housing 600 is stable while facilitating the relative rotation, and the connection between the third transmission portion 500 and the housing 600 is stable while facilitating the relative rotation.

In some embodiments of the present disclosure, an inner circumferential surface of the sleeve 300 and the outer circumferential surface of the second transmission portion 200 may include a structure such as stairs, and therefore, relative positions of the sleeve 300, the second transmission portion 200, and the second bearing 330 in an axial direction of the clutch apparatus 1 are limited, ensuring that the sleeve 300 and the second transmission portion 200 can simultaneously move in the axial direction of the clutch apparatus 1.

According to some embodiments of the present disclosure, as shown in FIG. 3 and FIG. 4, and FIG. 7 and FIG. 8, the clutch apparatus 1 further includes an elastic member 700. The elastic member 700 acts on the sleeve 300, and the elastic member 700 provides an elastic force for constantly pushing the second transmission portion 200 toward the engaged position. In this way, on one hand, a thrust force for pushing the second transmission portion 200 toward the engaged position is increased, thereby increasing the movement smoothness of the second transmission portion 200 toward the engaged position; on the other hand, when the second transmission portion 200 is located at the engaged position, the contact between the first transmission portion 100 and the second transmission portion 200 is closer, the connection is stable without energy consumption, and a fit clearance is further reduced.

In some embodiments of the present disclosure, the clutch apparatus 1 further includes a spring seat 340 and a spring sleeve 620. The spring seat 340 is sleeved on the second transmission portion 200 and mounted in the sleeve 300, the spring sleeve 620 is sleeved on the second transmission portion 200 and mounted in the housing 600. The elastic member 700 is a spring sleeved on the second transmission portion 200, and one end of the elastic member 700 abuts against the spring seat 340 and the other end of the elastic member 700 abuts against the interior of the spring sleeve 620. For example, a central axis of the spring seat 340, a central axis of the spring sleeve 620, a central axis of the elastic member 700, and a central axis of the second transmission portion 200 may coincide.

In this way, on one hand, an elastic force for constantly pushing the second transmission portion 200 toward the engaged position is easy to be provided by the elastic member 700; on the other hand, a torque of the entire second transmission portion 200 may keep symmetrical with respect to the central axis of the second transmission portion, so as to ensure that a movement direction and an extending direction of the second transmission portion 200 is the same, thereby ensuring the movement smoothness of the second transmission portion 200. In addition, by configuring the spring seat 340 and the spring sleeve 620, it is ensured that the elastic force of the elastic member 700 can be transferred to the sleeve 300 and the housing 600, and a position of the elastic member 700 is stable.

Figure 5:
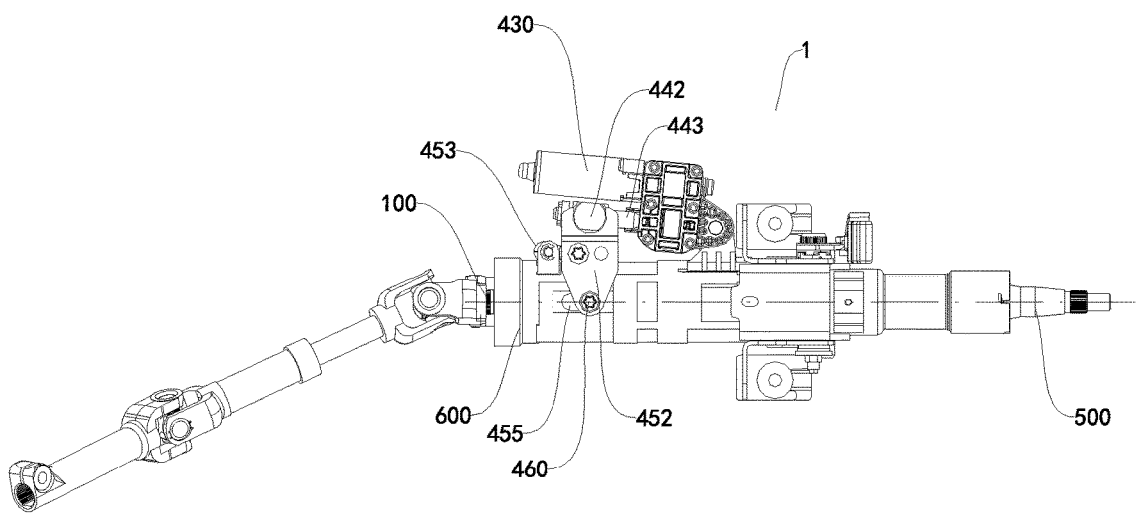
FIG. 5 is a schematic structural diagram of a clutch apparatus according to an embodiment of the present disclosure, where a second transmission portion is located at a disengaged position.

According to some embodiments of the present disclosure, as shown in FIG. 2 and FIG. 5, the linkage mechanism 450 is hinged to the sleeve 300 and the spring seat 340 by a hinge shaft 460, and the housing 600 includes a strip-shaped hole 455 for the hinge shaft 460 to pass through, so as to facilitate mounting of the hinge shaft 460.

In this way, the connection of the linkage mechanism 450 with the sleeve 300 and the spring seat 340 is stable, and it is easy for the linkage mechanism 450 to swing with respect to the sleeve 300 and the spring seat 340. In addition, the hinge shaft 460 can fix relative positions of the spring seat 340 and the sleeve 300, in this way, the hinge shaft 460 may be used to fix axial positions of the spring seat 340 and the sleeve 300 at the same time, so that the elastic force of the elastic member 700 is more reliable and accurately acts on the sleeve 300. In addition, the configuration of the strip-shaped hole 455 is convenient for the hinge shaft 460 to pass through the housing 600 and be hinged to the sleeve 300, and the hinge shaft 460 can move in a length direction of the strip-shaped hole 455, so that when the second transmission portion 200 moves, the hinge shaft 460 can move.

Figure 6:
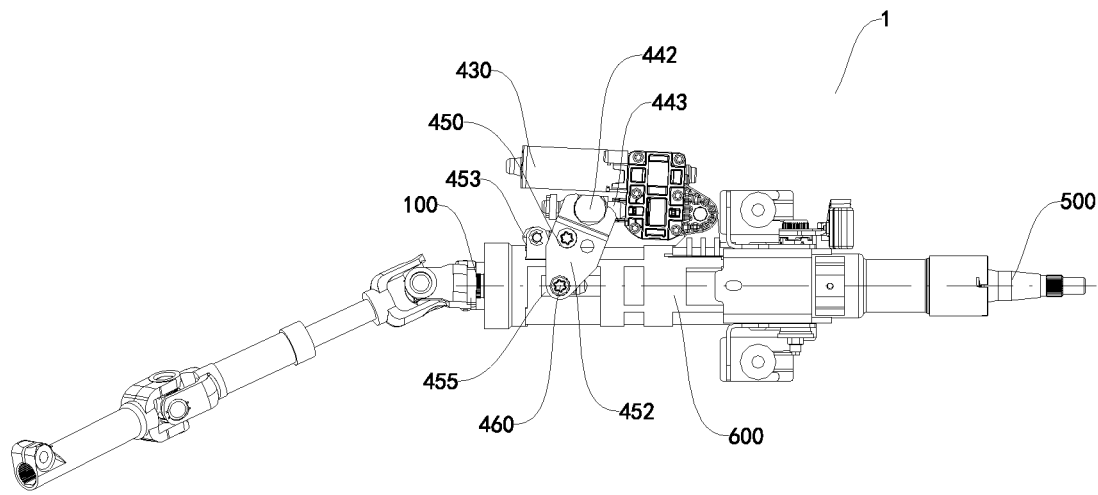
FIG. 6 is a schematic structural diagram of a clutch apparatus according to an embodiment of the present disclosure, where a second transmission portion is located at an engaged position.

According to some embodiments of the present disclosure, as shown in FIG. 5 to FIG. 7, the driving mechanism 400 further includes a transmission mechanism 440. The driving apparatus 430 is hinged to the housing 600, the driving apparatus 430 is in connection with the linkage mechanism 450 through the transmission mechanism 440, and the linkage mechanism 450 is independently hinged to the transmission mechanism 440, the housing 600, and the sleeve 300.

In this way, the driving mechanism 400 adopts the transmission mechanism 440 to transfer a driving force of the driving apparatus 430 to the linkage mechanism 450. Transfer of the driving force is stable, and after the driving force acts on the transmission mechanism 440, a direction of a force outputted by the transmission mechanism 440 may be different from the driving force of the driving apparatus 430. Therefore, the direction of a force outputted by the transmission mechanism 440 can better meet requirements for the movement of the linkage mechanism 450, increasing the configuration flexibility of the driving mechanism 400.

In some embodiments of the present disclosure, the linkage mechanism 450 includes a first swing connector 451, a second swing connector 452, and a longitudinal connecting rod 453. One end of the first swing connector 451 is hinged to the transmission mechanism 440, the other end of the first swing connector 451 is hinged to the sleeve 300. One end of the second swing connector 452 is hinged to the transmission mechanism 440, the other end of the second swing connector 452 is hinged to the sleeve 300. One end of the longitudinal connecting rod 453 is hinged to the housing 600, and the other end of the longitudinal connecting rod 453 is hinged to the first swing connector 451 and the second swing connector 452.

For example, the first swing connector 451 and the second swing connector 452 may be located on two opposite sides of the sleeve 300. A distance from a position of each swing connector connected to the longitudinal connecting rod 453 to a position of the swing connector hinged to the sleeve 300 may be less than a distance from the position of each swing connector connected to the longitudinal connecting rod 453 to a position of the swing connector hinged to the transmission mechanism 440.

Two swing connectors are arranged to act on the sleeve 300, enabling the entire sleeve 300 to be forced more uniformly, so as to improve the movement stability of the sleeve 300. In addition, the configuration of the longitudinal connecting rod 453 facilitates the synchronous movement of the first swing connector 451 and the second swing connector 452, and two ends of the first swing connector 451 and two ends of the second swing connector 452 can swing with the longitudinal connecting rod 453 as a pivot point. Each swing connector can form a structure similar to a "seesaw", so that a force that the linkage mechanism 450 acts on the sleeve 300 may be greater than the driving force of the driving apparatus 430. In addition, with the configuration of the linkage mechanism 450, the driving apparatus 430 does not need to be directly connected to the sleeve 300, which helps to reduce the volume of the entire driving mechanism 400 in the axial direction of the clutch apparatus 1.

In some embodiments of the present disclosure, the transmission mechanism 440 includes an output screw rod 441 and an output nut 442. The output screw rod 441 is in connection with the driving apparatus 430, the output nut 442 is sleeved on the output screw rod 441 and threadedly fits onto the output screw rod 441. The one end of the first swing connector 451 and the one end of the second swing connector 452 are hinged to the output nut 442.

For example, the driving apparatus 430 can drive the output screw rod 441 to rotate. The output screw rod 441 is threaded with and fits into the output nut 442, and therefore, when the output screw rod 441 rotates, the output nut 442 moves in an axial direction of the output screw rod 441, and in this case, the output nut 442 drives two swing connectors to swing, and then drives the sleeve 300 and the second transmission portion 200 to move in the axial direction of the clutch apparatus 1, to transform the rotation of the driving apparatus 430 into a linear reciprocating motion of the second transmission portion 200.

Figure 10:
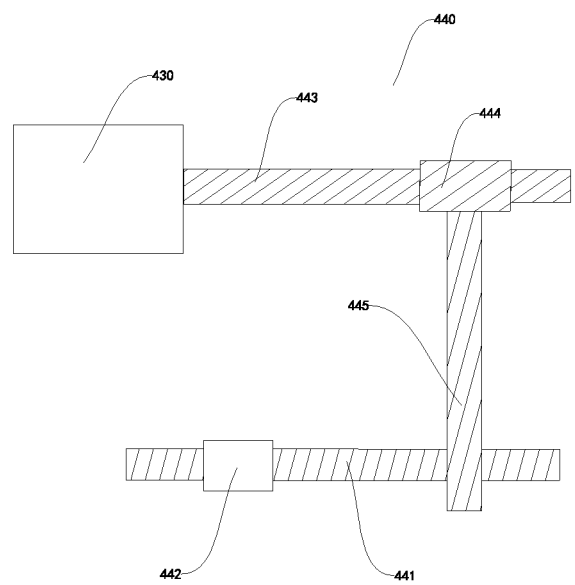
FIG. 10 is a schematic structural diagram of a transmission mechanism of a clutch apparatus according to an embodiment of the present disclosure.

As shown in FIG. 10, the transmission mechanism 440 further includes a transmission screw rod 443, a first transmission gear 444, and a second transmission gear 445. The driving apparatus 430 is a motor, and the transmission screw rod 443 is in connection with a motor shaft of the motor, where a moving direction of the sleeve 300 in the axial direction of the clutch apparatus 1 can be controlled by a rotation direction of the motor shaft of the motor (that is, rotation in a forward direction and a reverse direction). The first transmission gear 444 meshes with the transmission screw rod 443, the second transmission gear 445 is connected to the first transmission gear 444 and rotates with the first transmission gear 444, and the second transmission gear 445 meshes with the output screw rod 441.

For example, the first transmission gear 444 and the second transmission gear 445 may coaxially rotate. For example, the first transmission gear 444 and the second transmission gear 445 may be integrally formed, central axes of the first transmission gear 444 and the second transmission gear 445 may coincide, diameters of the first transmission gear 444 and the second transmission gear 445 may be different, and tooth types of the first transmission gear 444 and the second transmission gear 445 may be helical gears.

In this way, through the transfer of the first transmission gear 444 and the second transmission gear 445, a driving rotation speed and driving torque outputted by the driving apparatus 430 is different from a rotation speed and the torque received by the output screw rod 441. For example, the rotation speed of the output screw rod 441 may be less than the driving rotation speed outputted by the driving apparatus 430, and the torque of the output screw rod 441 may be greater than the driving torque outputted by the driving apparatus 430. In this case, the linkage mechanism 450 moves at a relatively slow speed and is subjected to a relatively high driving force, which helps to improve the movement stability of the linkage mechanism 450.

According to some embodiments of the present disclosure, as shown in FIG. 2, FIG. 5, and FIG. 6, the first swing connector 451 and the second swing connector 452 are hinged to two radial sides of the output nut 442, respectively. A hinge axis of the first swing connector 451 coincides with a hinge axis of the second swing connector 452, and is perpendicular to an axial direction of the output nut 442.

A moment arm between the first swing connector 451 and the output nut 442 and a moment arm between the second swing connector 452 and the output nut 442 may be located in the same straight line, and the straight line is perpendicular to the axial direction of the output nut 442. In this way, when the output nut 442 drives the first swing connector 451 and the second swing connector 452 to swing, the first swing connector 451 and the second swing connector 452 are subjected to the same torque from the output nut 442, so as to ensure that the first swing connector 451 and the second swing connector 452 synchronously move and have stable relative positions.

According to some embodiments of the present disclosure, as shown in FIG. 5 and FIG. 6, the longitudinal connecting rod 453 is hinged between two ends of the first swing connector 451 and between two ends of the second swing connector 452. The longitudinal connecting rod 453 is coupled with the first swing connector 451 at a first hinge joint, the longitudinal connecting rod 453 is coupled with the second swing connector 452 at a second hinge joint, and a position of the first hinge joint disposed in a length direction of the first swing connector 451 is consistent with a position of the second hinge joint disposed in a length direction of the second swing connector 452.

In this way, a motion amplitude of the first swing connector 451 and a motion amplitude of the second swing connector 452 are the same, so that a movement direction of the sleeve 300 is consistent with the axial direction to improve the movement smoothness of the clutch apparatus 1. In addition, each swing connector is easy to form a "seesaw" structure.

A vehicle steering system according to the embodiments of the present disclosure is described below with reference to the accompanying drawings. The vehicle steering system includes a clutch apparatus 1, a steering wheel, and a steering device.

The steering wheel is in connection with one of a first transmission portion 100 and a second transmission portion 200, and the steering device is in connection with the other one of the first transmission portion 100 and the second transmission portion 200. For example, the steering wheel is in connection with one of a third transmission portion 500 and the second transmission portion 200 and transmits the torque, and the steering device is in connection with the first transmission portion 100 and transmits the torque.

According to the vehicle steering system of the present disclosure, by using the clutch apparatus 1 according to the foregoing embodiments of the present disclosure, the rotation torque can be transmitted and transmitting the rotation torque can be stopped with low costs and a flexible configuration.

In some embodiments of the present disclosure, the vehicle steering system further includes a rotation angle limiting device 30100. The rotation angle limiting device is connected to one of the first transmission portion 100 and the second transmission portion 200. When the second transmission portion 200 is located at a disengaged position, the rotation angle limiting device 30100 limits a maximum rotation angle of the steering wheel by limiting a maximum rotation angle of one of the first transmission portion 100 and the second transmission portion 200.

For example, the first transmission portion 100 is connected to the steering device such as a wheel, the second transmission portion 200 is connected to the steering wheel, the second transmission portion 200 is configured to move between an engaged position and the disengaged position. The second transmission portion 200 is engaged with the first transmission portion 100 and transmits the rotation torque of the steering wheel to the wheel at the engaged position, to implement the linkage movement between the wheel and the steering wheel. For example, when the steering wheel is rotated to the left, the wheel is rotated to the left, and when the steering wheel is rotated to the right, the wheel is rotated to the right. The second transmission portion 200 is disengaged from the first transmission portion 100 and stops transmitting the rotation torque of the steering wheel to the wheel at the disengaged position, to implement separating the rotation of the wheel and the steering wheel. For example, when the wheel rotates to the left, the steering wheel may not rotate, and when the steering wheel rotates to the left, the wheel may not rotate.

In addition, the rotation angle limiting device 30100 is connected to the second transmission portion 200, and when the second transmission portion 200 is located at the disengaged position, the rotation angle limiting device 30100 limits a maximum rotation angle of the steering wheel by limiting a maximum rotation angle of the second transmission portion 200. In this way, the clutch apparatus 1 is independently arranged, it is convenient to transmit the torque or stop transmitting the torque between the steering wheel and the wheel, and when the clutch apparatus 1 is in a coupled state, limiting the maximum rotation angle of the steering wheel does not affect the rotation of the wheel, ensuring normal driving of a vehicle.

Figure 11:
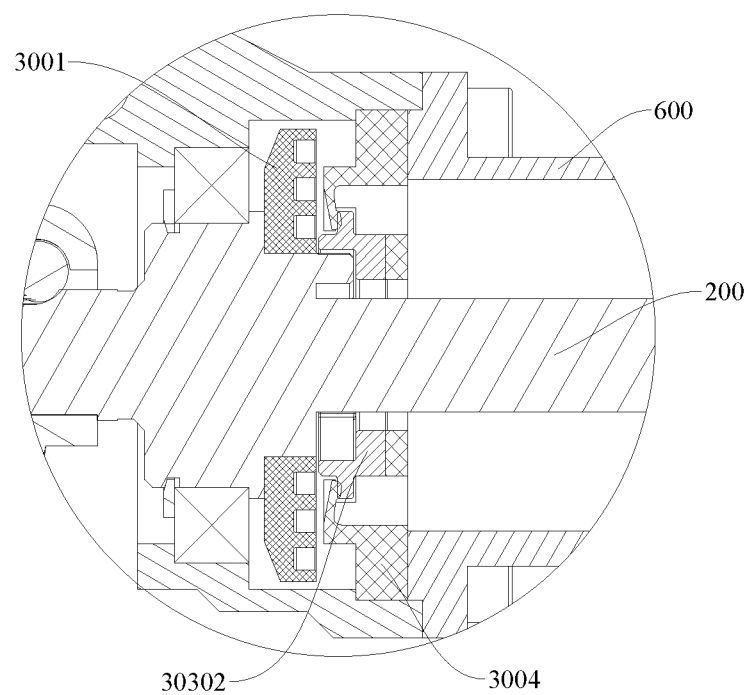
FIG. 11 is a sectional view of a rotation angle limiting device of a vehicle steering system according to an embodiment of the present disclosure.
Figure 12:
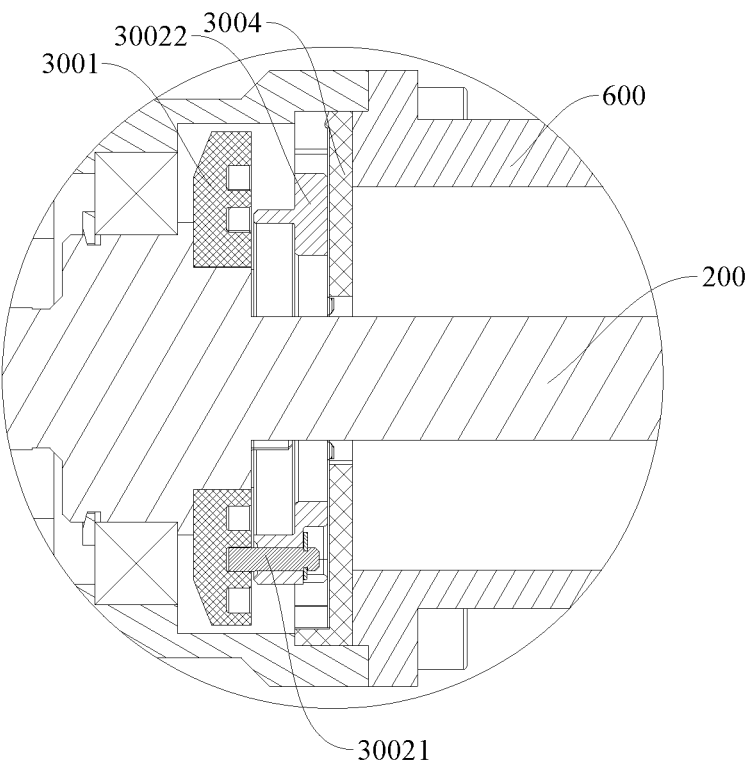
FIG. 12 is another sectional view of a rotation angle limiting device of a vehicle steering system according to an embodiment of the present disclosure.

In some embodiments of the present disclosure, as shown in FIG. 11 and FIG. 12, the second transmission portion 200 passes through the rotation angle limiting device 30100, a connection position of the rotation angle limiting device 30100 with the second transmission portion 200 is adjacent to an end of the second transmission portion 200 facing toward the first transmission portion 100. That is, a distance from the connection position of the rotation angle limiting device 30100 with the second transmission portion 200 to the first transmission portion 100 is less than a distance from the connection position of the rotation angle limiting device 30100 with the second transmission portion 200 to the steering wheel. A vehicle body has a large space in which the first transmission portion 100 and the second transmission portion 200 is connected, and therefore, the rotation angle limiting device 30100 is arranged/disposed at an end of the second transmission portion 200 facing toward the first transmission portion 100, thereby reducing the configuration difficulty of the rotation angle limiting device 30100 and improving the space utilization of the vehicle. The second transmission portion 200 passes through the rotation angle limiting device 30100, facilitating circumferential limitation on the second transmission portion 200 and reducing occupied space.

Figure 13:
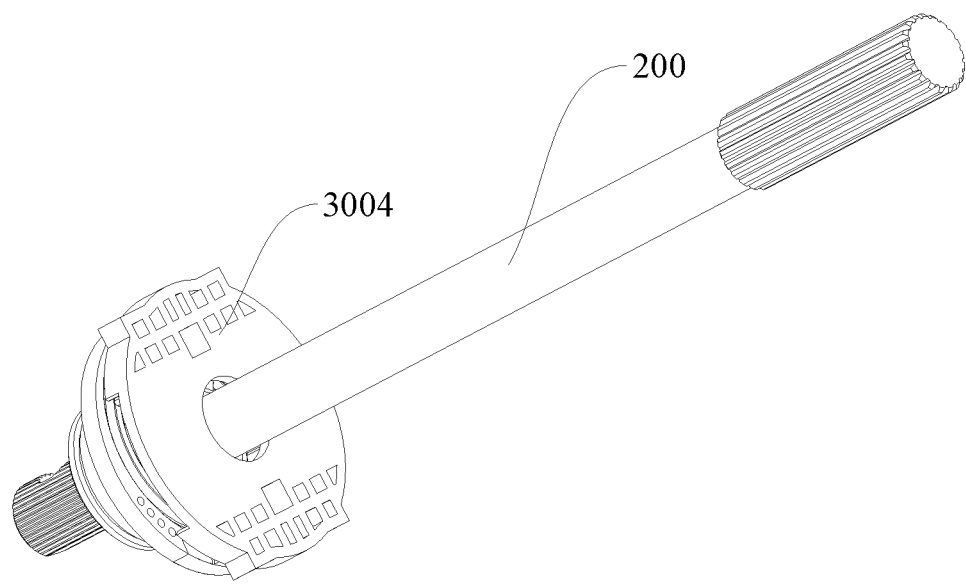
FIG. 13 is a schematic structural diagram of a fixed member of a rotation angle limiting device of a vehicle steering system according to an embodiment of the present disclosure.

In some embodiments of the present disclosure, as shown in FIG. 13, the rotation angle limiting device 30100 is located on a side of the head portion 230 facing away from the first transmission portion 100. Therefore, the space is fully utilized, and the rotation angle limiting device 30100 is connected to the second transmission portion 200 in an axial direction, facilitating transmission of the limiting torque, so that the rotation angle limiting device 30100 limits the maximum rotation angle of the second transmission portion 200 more effectively.

Figure 14:
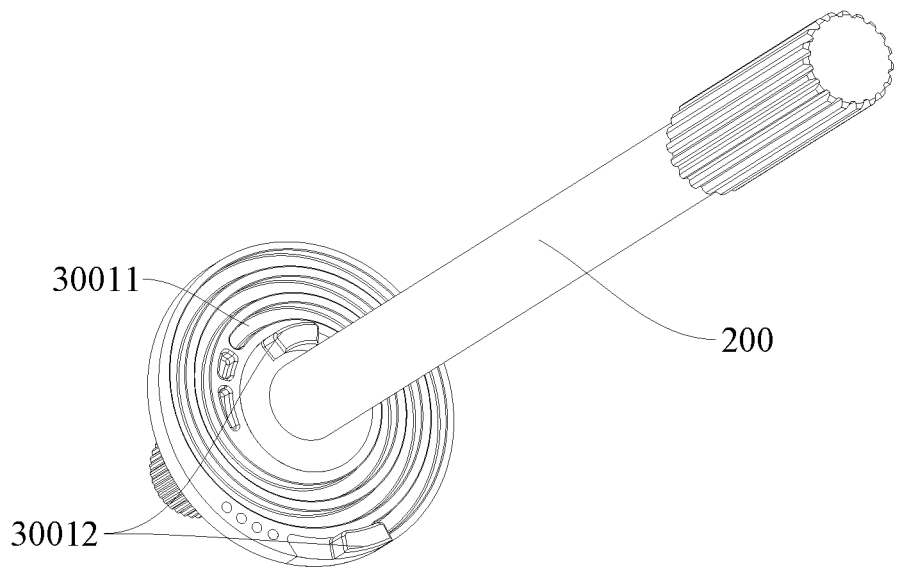
FIG. 14 is a schematic structural diagram of a spiral groove and a first limiting structure of a rotation angle limiting device of a vehicle steering system according to an embodiment of the present disclosure.
Figure 15:
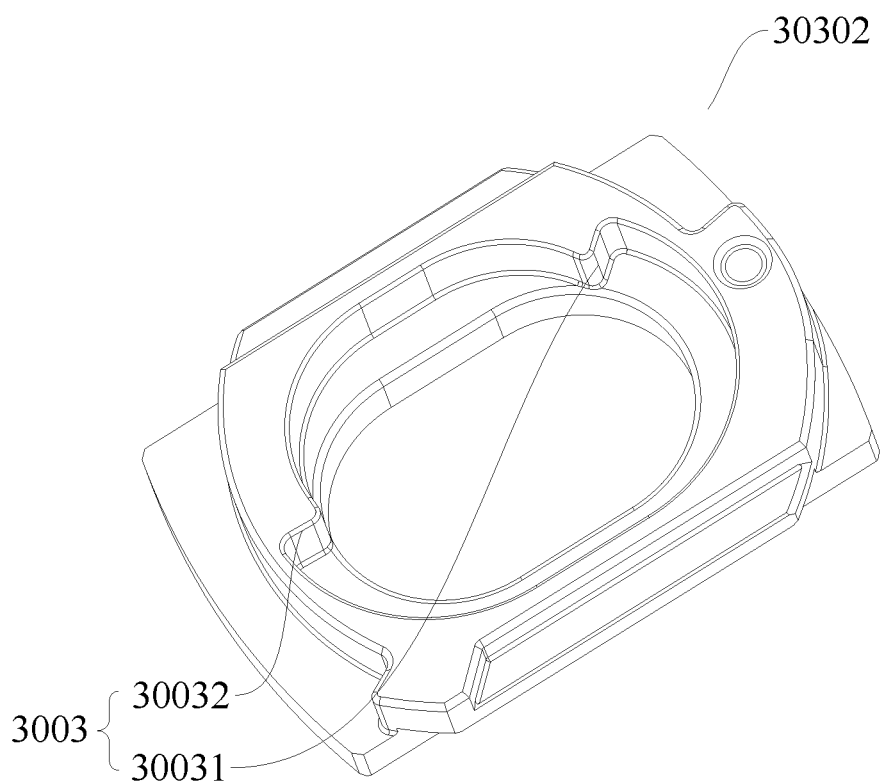
FIG. 15 is a schematic structural diagram of a movable member of a rotation angle limiting device of a vehicle steering system according to an embodiment of the present disclosure.

According to some embodiments of the present disclosure, as shown in FIG. 11, FIG. 14, and FIG. 15, the rotation angle limiting device 30100 includes a rotating gear 3001 and a movable member 30302.

The rotating gear 3001 is connected to the second transmission portion 200 and rotates with the second transmission portion 200. A first limiting structure 30012 is arranged/disposed on the rotating gear 3001, and a second limiting structure 3003 is arranged/disposed on the movable member 30302. When rotating with the second transmission portion 200, the rotating gear 3001 drives the movable member 30302 to move, to cause the first limiting structure 30012 abuts against the second limiting structure 3003. The second limiting structure 3003 includes a first limiting sub-structure 30031 and a second limiting sub-structure 30032, and the first limiting sub-structure 30031 and the second limiting sub-structure 30032 limits a maximum rotation angle of the rotating gear 3001 by stopping the first limiting structure 30012.

For example, the rotating gear 3001 and the second transmission portion 200 may be fixed along a circumferential direction of the second transmission portion 200, and the rotating gear 3001 and the second transmission portion 200 may move with respect to each other in an axial direction of the second transmission portion 200. For example, the rotating gear 3001 and the second transmission portion 200 may be connected by a spline, or the rotating gear 3001 and the second transmission portion 200 may be fitted by a tooth and a toothed groove. For example, when the second transmission portion 200 moves to the disengaged position, the tooth meshes with the toothed groove, and when the second transmission portion 200 moves to the engaged position, the tooth is disengaged from the toothed groove.

In addition, the first limiting sub-structure 30031 and the second limiting sub-structure 30032 may be arranged/disposed at intervals along a circumferential direction of the movable member 30302, and the first limiting structure 30012 is located between the first limiting sub-structure 30031 and the second limiting sub-structure 30032. For example, the second transmission portion 200 is located at the disengaged position, viewed from above the vehicle, when the second transmission portion 200 rotates counter-clockwise (that is, rotates left) to a limit position, the first limiting structure 30012 abuts against the first limiting sub-structure 30031; and when the second transmission portion 200 rotates clockwise (for example, rotates right) to a limit position, the first limiting structure 30012 abuts against the second limiting sub-structure 30032.

The configuration of the first limiting structure 30012 and the second limiting structure 3003 facilitates limitation on a rotation angle of the second transmission portion 200 at the disengaged position, and such a limiting manner is a mechanical limitation without energy consumption.

Figure 16:
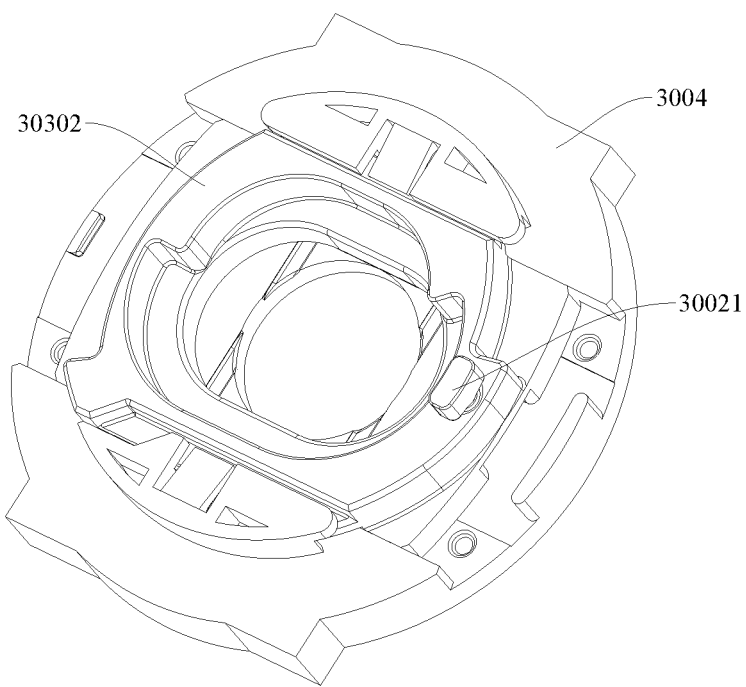
FIG. 16 is a schematic assembly diagram of a movable member and a fixed member of a rotation angle limiting device of a vehicle steering system according to an embodiment of the present disclosure.
Figure 17:
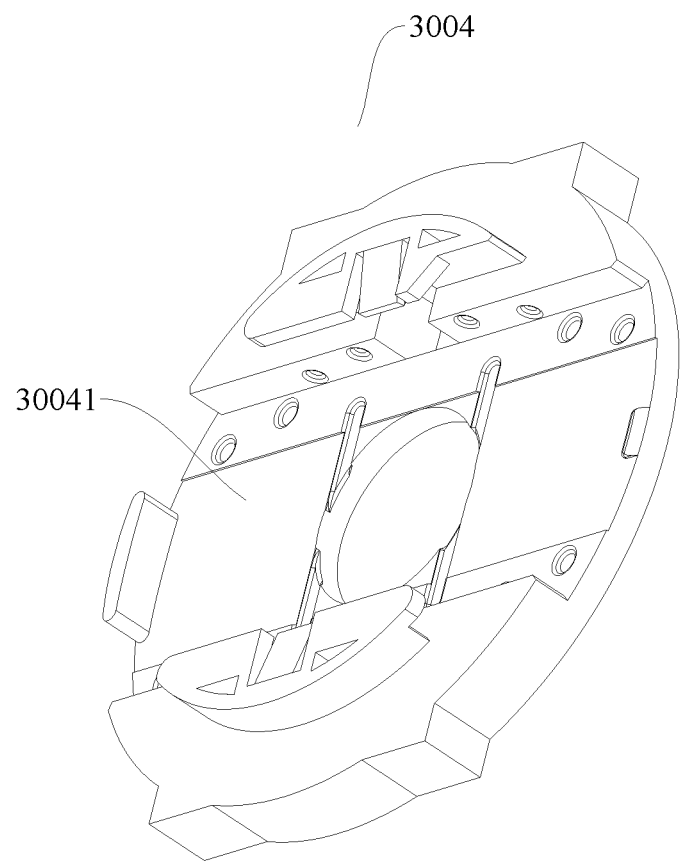
FIG. 17 is a schematic structural diagram of a fixed member of a rotation angle limiting device of a vehicle steering system according to an embodiment of the present disclosure.

According to some embodiments of the present disclosure, as shown in FIG. 14 and FIG. 16, the rotating gear 3001 is provided with or has a spiral groove 30011, a guide shaft 30021 is arranged/disposed on the movable member 30302, the guide shaft 30021 movably fits into or coupled with the spiral groove 30011, and when moving with the second transmission portion 200, the rotating gear 3001 drives the movable member 30302 to move through the guide shaft 30021.

For example, during the rotation of the rotating gear 3001 around a central axis of the rotating gear 3001, the guide shaft 30021 moves relative to the spiral groove 30011, and since the guide shaft 30021 is arranged on the movable member 30302, the guide shaft 30021 drives the movable member 30302 to move relative to the fixed member 3004. In this way, the movable member 30302 moves relative to the housing 600 in a radial direction of the second transmission portion 200, and therefore, when the clutch apparatus 1 is in a decoupled state, the maximum rotation angle of the steering wheel is greater than 360°.

A vehicle according to the embodiments of the present disclosure is described below with the accompanying drawings. The vehicle includes the vehicle steering system according to the embodiments of the present disclosure.

The vehicle according to the embodiments of the present disclosure, by using the vehicle steering system according to the foregoing embodiment of the present disclosure, can transmit the steering torque and stop transmitting the steering torque with low costs and a flexible configuration.

Other configurations and operations of the clutch apparatus 1, the vehicle steering system, and the vehicle according to the embodiments of the present disclosure are not be described in detail herein.

In the description of this specification, description of reference terms such as "an embodiment" or "an example", means including specific features, structures, materials, or features described in the embodiment or example in at least one embodiment or example of the present disclosure. In this specification, schematic descriptions of the foregoing terms do not necessarily refer to the same embodiment or example.

Although the embodiments of the present disclosure have been shown and described, a person of ordinary skill in the art should understand that various changes, modifications, replacements, and variations may be made to the embodiments without departing from the principles and spirit of the present disclosure, and the scope of the present disclosure is as defined by the appended claims and their equivalents.

What is claimed is:

1. A clutch apparatus, comprising:
a first transmission portion and a second transmission portion, wherein the second transmission portion is configured to move along an axial direction of the second transmission portion between an engaged position and a disengaged position, the second transmission portion is engaged with the first transmission portion at the engaged position and transmits torque at the engaged position, and the second transmission portion is disengaged from the first transmission portion at the disengaged position and stops transmitting the torque at the disengaged position;
a sleeve, sleeved on the second transmission portion, wherein the sleeve is configured to move along the axial direction of the second transmission portion;
a driving mechanism, comprising a driving apparatus and a linkage mechanism, wherein the linkage mechanism is in connection with the driving apparatus and the sleeve, and the driving apparatus drives the linkage mechanism to move, through the sleeve, to drive the second transmission portion to move between the engaged position and the disengaged position; and
a first hinge point and a second hinge point between the linkage mechanism and the sleeve, wherein a connection line between the first hinge point and the second hinge point passes through a center of a cross section of the sleeve.

2. The clutch apparatus according to claim 1, wherein the cross section of the sleeve is annular, and the first hinge point and the second hinge point are disposed opposite to each other in a radial direction of the sleeve.

3. The clutch apparatus according to claim 1, further comprising:
a third transmission portion, wherein the second transmission portion is connected to the third transmission portion, the second transmission portion is coupled with the third transmission portion to transmit the torque, and the second transmission portion is configured to move with respect to the third transmission portion between the engaged position and the disengaged position.

4. The clutch apparatus according to claim 3, wherein
the third transmission portion comprises a cavity, and the second transmission portion is configured to extend into the cavity; and
one of an inner circumferential surface of the third transmission portion and an outer circumferential surface of the second transmission portion comprises a slide groove, the other one of the inner circumferential surface of the third transmission portion and the outer circumferential surface of the second transmission portion comprises a slide rail, the slide groove and the slide rail extend in an axial direction of the first transmission portion and the second transmission portion, and the slide rail fits into the slide groove.

5. The clutch apparatus according to claim 1, wherein the second transmission portion comprises:
a shaft portion; and
a head portion, connected to an end of the shaft portion and facing toward the first transmission portion, wherein
when the second transmission portion is at the engaged position, the head portion is engaged with the first transmission portion; and
when the second transmission portion is at the disengaged position, the head portion is disengaged from the first transmission portion.

6. The clutch apparatus according to claim 1, wherein one of the first transmission portion and the second transmission portion comprises a flange, the other one of the first transmission portion and the second transmission portion comprises a groove, and a cross section of the flange and a cross section of the groove have non-circular shapes coupled to each other, wherein
when the second transmission portion is at the engaged position, the flange extends into the groove; and
when the second transmission portion is at the disengaged position, the flange is disengaged from the groove.

7. The clutch apparatus according to claim 1, further comprising:
a housing, wherein at least a part of the first transmission portion, at least a part of the second transmission portion, and the sleeve are disposed in the housing, and the driving mechanism is mounted on the housing.

8. The clutch apparatus according to claim 7, wherein
the first transmission portion is supported on the housing by a first bearing;
the second transmission portion is supported on the sleeve by a second bearing; and
the sleeve is supported on the housing by a third bearing, and an elastic member acts on the sleeve and provides an elastic force for pushing the second transmission portion toward the engaged position.

9. The clutch apparatus according to claim 8, further comprising:
a spring seat, sleeved on the second transmission portion and disposed in the sleeve; and
a spring sleeve, sleeved on the second transmission portion and disposed in the housing, wherein
the elastic member comprises a spring sleeved on the second transmission portion, and a first end of the elastic member abuts against the spring seat and a second end of the elastic member abuts against an interior of the spring sleeve.

10. The clutch apparatus according to claim 9, wherein the linkage mechanism is hinged with the sleeve and the spring seat by a hinge shaft, and the housing comprises a strip-shaped hole for the hinge shaft to pass through.

11. The clutch apparatus according to claim 7, wherein the driving mechanism further comprises:
a transmission mechanism, wherein the driving apparatus is in connection with the linkage mechanism through the transmission mechanism, the driving apparatus is hinged with the housing, and the linkage mechanism is hinged with the transmission mechanism, the housing, and the sleeve.

12. The clutch apparatus according to claim 11, wherein the linkage mechanism comprises:
a first swing connector, wherein a first end of the first swing connector is hinged with the transmission mechanism, and a second end of the first swing connector is hinged with the sleeve;
a second swing connector, wherein a first end of the second swing connector is hinged with the transmission mechanism, and a second end of the second swing connector is hinged with the sleeve; and
a longitudinal connecting rod, wherein a first end of the longitudinal connecting rod is hinged with the housing, and a second end of the longitudinal connecting rod is hinged with the first swing connector and the second swing connector.

13. The clutch apparatus according to claim 12, wherein the transmission mechanism comprises:
an output screw rod, wherein the output screw rod is in connection with the driving apparatus; and
an output nut, wherein the output nut is sleeved on the output screw rod and threaded with the output screw rod, wherein the first end of the first swing connector and the first end of the second swing connector are hinged with the output nut.

14. The clutch apparatus according to claim 13, wherein the transmission mechanism further comprises:
a transmission screw rod, wherein the driving apparatus comprises a motor, and the transmission screw rod is in connection with a motor shaft of the motor;
a first transmission gear, wherein the first transmission gear meshes with the transmission screw rod; and
a second transmission gear, wherein the second transmission gear is connected to the first transmission gear and rotates with the first transmission gear, and the second transmission gear meshes with the output screw rod.

15. The clutch apparatus according to claim 13, wherein the first swing connector and the second swing connector are respectively hinged with two radial sides of the output nut, and a hinge axis of the first swing connector coincides with a hinge axis of the second swing connector and is perpendicular to a radial direction of the output nut.

16. The clutch apparatus according to claim 12, wherein the longitudinal connecting rod is hinged between the first end and the second end of the first swing connector and hinged between the first end and the second end of the second swing connector, the longitudinal connecting rod is coupled with the first swing connector at a first hinge joint, the longitudinal connecting rod is coupled with the second swing connector at a second hinge joint, and a position of the first hinge joint disposed in a length direction of the first swing connector is consistent with a position of the second hinge joint disposed in a length direction of the second swing connector.

17. A vehicle steering system, comprising:
a clutch apparatus, wherein the clutch apparatus comprises:
a first transmission portion and a second transmission portion, wherein the second transmission portion is configured to move along an axial direction of the second transmission portion between an engaged position and a disengaged position, the second transmission portion is engaged with the first transmission portion at the engaged position and transmits torque at the engaged position, and the second transmission portion is disengaged from the first transmission portion at the disengaged position and stops transmitting the torque at the disengaged position;
a sleeve, sleeved on the second transmission portion, wherein the sleeve is configured to move along the axial direction of the second transmission portion;
a driving mechanism, comprising a driving apparatus and a linkage mechanism, wherein the linkage mechanism is in connection with the driving apparatus and the sleeve, and the driving apparatus drives the linkage mechanism to move, through the sleeve, to drive the second transmission portion to move between the engaged position and the disengaged position; and
a first hinge point and a second hinge point between the linkage mechanism and the sleeve, wherein a connection line between the first hinge point and the second hinge point passes through a center of a cross section of the sleeve;
a steering wheel, wherein the steering wheel is in connection with one of the first transmission portion and the second transmission portion; and
a steering device, wherein the steering device is in connection with the other one of the first transmission portion and the second transmission portion.

18. The vehicle steering system according to claim 17, further comprising a rotation angle limiting device, wherein the rotation angle limiting device is connected to one of the first transmission portion and the second transmission portion, and when the second transmission portion is at the disengaged position, the rotation angle limiting device limits a maximum rotation angle of the steering wheel by limiting a maximum rotation angle of one of the first transmission portion and the second transmission portion.

19. A vehicle, comprising a vehicle steering system comprising:
- a clutch apparatus, wherein the clutch apparatus comprises:
  - a first transmission portion and a second transmission portion, wherein the second transmission portion is configured to move along an axial direction of the second transmission portion between an engaged position and a disengaged position, the second transmission portion is engaged with the first transmission portion at the engaged position and transmits torque at the engaged position, and the second transmission portion is disengaged from the first transmission portion at the disengaged position and stops transmitting the torque at the disengaged position;
  - a sleeve, sleeved on the second transmission portion, wherein the sleeve is configured to move along the axial direction of the second transmission portion;
  - a driving mechanism, comprising a driving apparatus and a linkage mechanism, wherein the linkage mechanism is in connection with the driving apparatus and the sleeve, and the driving apparatus drives the linkage mechanism to move, through the sleeve, to drive the second transmission portion to move between the engaged position and the disengaged position; and
  - a first hinge point and a second hinge point between the linkage mechanism and the sleeve, wherein a connection line between the first hinge point and the second hinge point passes through a center of a cross section of the sleeve;
- a steering wheel, wherein the steering wheel is in connection with one of the first transmission portion and the second transmission portion; and
- a steering device, wherein the steering device is in connection with the other one of the first transmission portion and the second transmission portion.

* * * * *